Sept. 28, 1965 W. E. HENNELLS ETAL 3,208,803
GUIDE BEARING AND ROD SEAL
Filed May 9, 1962
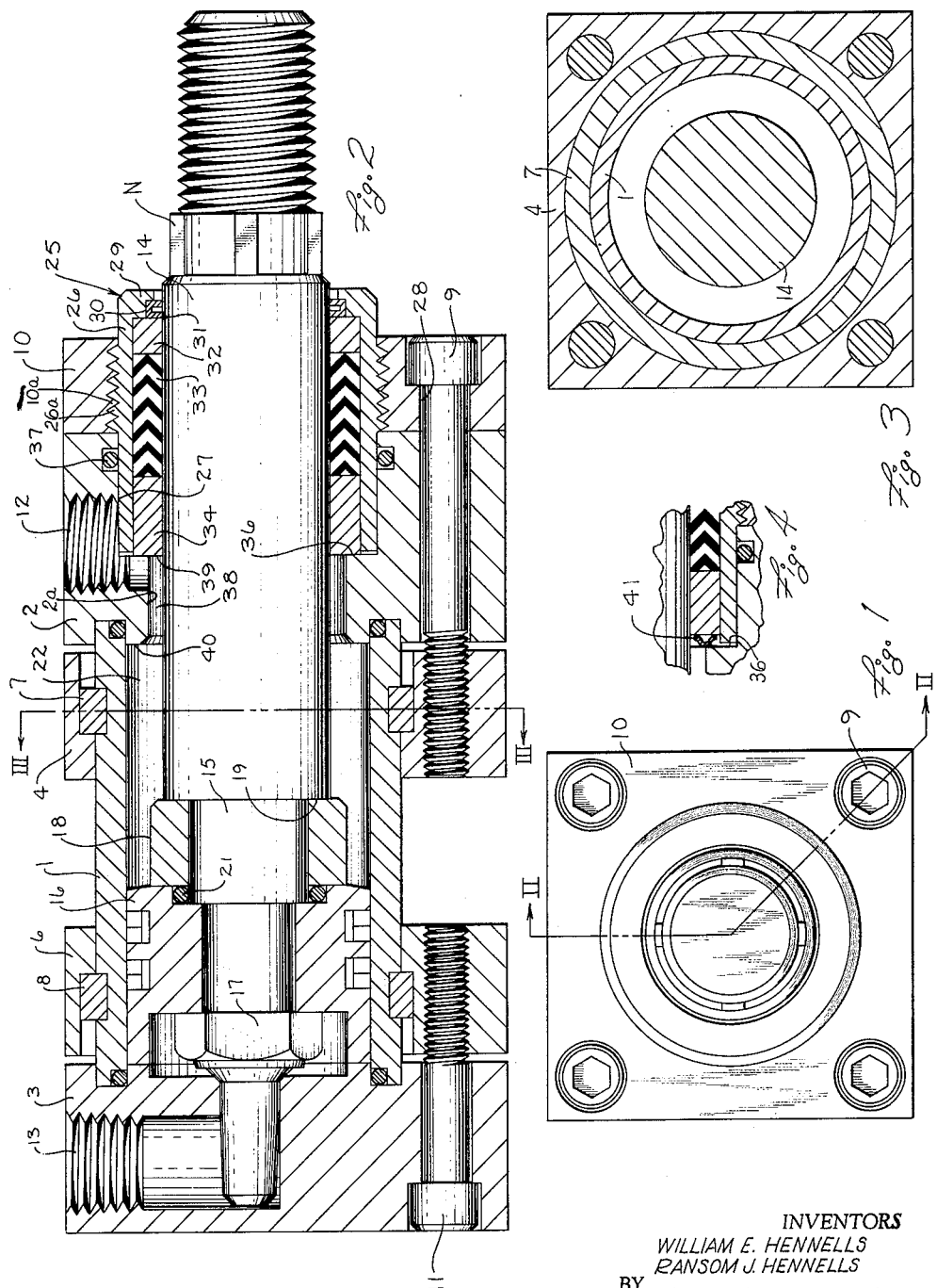
INVENTORS
WILLIAM E. HENNELLS
RANSOM J. HENNELLS
BY
Woodhams, Blanchard & Flynn
ATTORNEYS United States Patent Office 3,208,803
Patented Sept. 28, 1965

3,208,803
GUIDE BEARING AND ROD SEAL
William E. Hennells, Belleville, and Ransom J. Hennells, Plymouth, Mich., assignors to W. E. Hennells Co. Inc., Belleville, Mich., a corporation of Michigan
Filed May 9, 1962, Ser. No. 193,541
6 Claims. (Cl. 308—3.5)

This invention relates to a pressure fluid cylinder and particularly to a combined guide bearing and rod seal for use in connection therewith.

In the design of pressure fluid cylinders, wherein the pressure fluid is either air or liquid, there have been in the past a wide variety of specific designs suggested for guiding the rod with respect to the cylinder housing and for effecting a seal between the rod and the cylinder housing. While some previous attempts have been made to combine such rod guides and rod seals together into a single unit, and some prior workers in the field have even arranged these parts into a cartridge-type unit, such previous attempts have not been wholly satisfactory for a variety of reasons. In some units no provision is made for tightening the shaft packing after the installation of the cartridge into its operating position; in other units no provision is made for tightening the packing in accordance with the pressure appearing in the cylinder and requiring sealing; in still other units the pressure fluid is permitted to penetrate to an area in between the bearing housing and the surrounding casing which results in forcing the bearing into an off-center position with a consequent misalignment and excessive wear; and in still further cases the bearing units are not mounted firmly and solidly with respect to the cylinder structure.

Accordingly, the objects of the invention include:

(1) To provide a pressure fluid cylinder having a combined bearing and seal arrangement with respect thereto for solid and reliable holding of the rod in an exactly predetermined position with respect to the said cylinder.

(2) To provide apparatus, as aforesaid, in which the bushings by which the reciprocable rod is guided are solidly positioned and held with respect to the pressure fluid cylinder.

(3) To provide apparatus, as aforesaid, in which pressure fluid is positively prevented from entering into the zone behind the bushing retaining means whereby to urge said bushings out of alignment with said rod and thereby promote excessive and eccentric wear thereof.

(4) To provide apparatus, as aforesaid, which can be arranged in a cartridge package for easy and rapid insertion either in the original manufacture of the cylinder or for equally easy and rapid replacement in the field for maintenance purposes.

(5) To provide apparatus, as aforesaid, having positive pilot means in the portion thereof holding the rod guiding bushing while at the same time having radially adjustable means for holding threaded axially adjustable means for said bushing.

(6) To provide apparatus, as aforesaid, having positive adjustment means for effecting a tightening of the packing mechanically as same is subjected to wear.

(7) To provide means, as aforesaid, including means for tightening said packing in response to pressure fluid as and when the pressure thereof rises from a previously existing value.

(8) To provide apparatus, as aforesaid, which will be inexpensive to make and will yet be reliable in operation and capable of long and trouble-free service.

(9) To provide apparatus, as aforesaid, which will be capable of expression in a wide variety of specific embodiments whereby to meet and satisfactorily handle a wide variety of operating requirements.

Other objects and purposes of the invention will become apparent to persons acquainted with apparatus of this general type upon reading the following disclosure and inspection of the accompanying drawings.

In the drawings:

FIGURE 1 is an end view of apparatus embodying the invention.

FIGURE 2 is a section taken on the line II—II of FIGURE 1.

FIGURE 3 is a section taken on the line III—III of FIGURE 2.

FIGURE 4 is a view corresponding to a fragment of FIGURE 3 and showing a modification.

In the hereinafter appearing description, a number of words will be used for convenience in reference and it will be understood that these words are for reference purposes only and are not intended as limiting. For example, the terms "inner" and "outer" will refer to directions toward and away from the geometric center of the apparatus. The terms "rightwardly" and "leftwardly" will refer to such directions as appearing in the drawings. Said words will include derivatives thereof as well as words of similar import.

Referring now to the drawings, a cylinder 1 is received into end fittings 2 and 3. The end fitting 2 has an opening 2a therethrough through which a rod 14 extends. A bearing and packing supporting member 10, hereinafter further described, lies immediately against the outer end of the end fitting 2. Anchor rings 4 and 6 are anchored to the cylinder 1 by the snap rings 7 and 8, respectively. Suitable means such as screws of which two are shown at 9 and 11, respectively, are provided for urging the end fitting 2 and member 10 on the one hand, and the end fitting 3 on the other hand, respectively, toward the anchor members 4 and 6 and thereby urging same solidly against the respectively adjacent ends of the cylinder 1. Entry ports for pressure fluid are provided at 12 and 13, respectively, through the end fittings 2 and 3. A reciprocable rod 14 is located within said cylinder and carries a piston 16 which may be affixed thereto in any convenient manner, such as by a nut 17 holding said piston firmly against a cushion member 18 which in turn abuts a shoulder 19 on the rod 14. An O-ring 21 is provided for preventing escape of pressure fluid from within the chamber 22 past the piston 16.

Returning now to the bearing and packing supporting member 10, same is internally threaded at 10a for the threaded support of a cartridge 25 having a casing 26. Said cartridge casing 26 has external threads 26a adjacent its outer end for threadedly engaging the threads 10a of the support member 10. The inner end of said cartridge casing 26 extends into and snugly pilots against the internal surface of the enlarged recess 27 in the opening 2a of the rightward end fitting 2. The openings 28 within the member 10 through which the screws 9 extend are made of a diameter sufficiently larger than that of said screws to permit a slight radial adjustment of the member 10. Thus, the radial location of the cartridge casing 26 will be determined by the close fitting of its inner portion against the surface of recess 27 and will not be influenced by any possible irregularities or lack of concentricity in the threading between the member 10 and said cartridge casing 26 or the location of the openings through which the screws 9 extend.

The outer end of said cartridge casing 26 has a radially inwardly extending flange 29. Said flange has an axially inwardly opening recess 30 for the reception of a rod wiper 31. Immediately inwardly of said flange 29 is located the outer bushing 32, the same being seated solidly within the cartridge casing 26 and against the flange 29 and closely embracing the rod 14. Next inwardly from the outer bushing 32 is a plurality of shaft packing rings 33 which in this instance are illustrated as being of substantially V-shaped cross section whose open sides face the bushing 34 but which may be any of many well-known types of low friction pressure resistant packings such as graphite impregnated aluminum or lead foil packings. Next inwardly from the packing 33 is the inner bushing 34 which is snugly fitted within the cartridge casing 26 and has its inside diameter fitting snugly against the rod 14. The inner end 39 of the bushing 34, in the embodiment shown in FIGURE 1, protrudes somewhat inwardly from the cartridge casing 26 and bears against the shoulder 36 provided at the end of the recess 27. A short passageway 38 for cushioning purposes is provided in a known manner between the cylinder interior 22 and the port 12. As the piston and rod move rightwardly, the cushion member 18 enters into said passageway 38, partially filling same and thereby restricting the further flow of pressure fluid from within said chamber 22 out through the port 12. This provides a cushioning of the piston 16 against hitting the wall 40 with excessive force.

An O-ring 37 is provided as far inwardly as possible from the outer (rightward) end of the end fitting 2 for engaging the cartridge casing 26 and sealing it against the passage of pressure fluid from within the cushion passageway 38. If desired, the rod 14 may consist of a sleeve over an inner rod 15 and held in place by a nut N on the threaded portion at the outward end of said rod. This, however, is merely a detail of construction of said rod and, accordingly, all references herein to "rod" include the entirety of the construction designated by the numeral 14.

A study of the operation of the seal and rod guide will indicate the manner in which it fulfills the purposes and objectives above set forth. First, both bushings 32 and 34 as well as the packing 33 are conveniently contained within a compact cartridge whereby same may be easily installed into its operating position in the initial manufacture of the cylinder as well as be equally readily removed and replaced if and when desired for purposes of ordinary maintenance. Next, as above indicated, the cartridge casing 26 is pivoted by the walls of the recess 27 which in combination with the looseness of the openings 28 for the screws 9 insures that the cartridge 25 will be accurately aligned with respect to the end fitting 2 and not distorted by lack of concentricity in the threads between the member 10 and the cartridge casing 26. Next, the inner bushing 34 is restrained against radial movement by its engagement with the internal wall of the cartridge casing 26 which in turn is restrained against radial movement by the internal wall of the end fitting 2. Thus, said bushing is held firmly in place and is able to guide the rod 14 accurately. Next, the projection of the bushing 34 beyond the inner end of the cartridge casing 26 in the embodiment shown in FIGURE 2 makes it easy to compress the packing 33 to any desired degree by mere rotation of the cartridge casing 26 which can be accomplished in any convenient manner. With the V-shaped packing here shown acting against the radially inner and outer corners of the bushing 34 at the outer end thereof, pressure fluid will not be able to press against the outer surface of the bushing 34. Therefore, the pressure on the inner surface 39 thereof will further assist in pressing the bushing 34 outwardly against the packing 33 and cause the pressure on the packing in this manner to follow somewhat any changes in the pressure exerted by the pressure fluid within the cushioning passageway 38. While the outer bushing 32 carries considerably less load than does the inner bushing 34, it too is restrained against radial movement by the cartridge casing 26 which in turn is restrained against radial movement by the member 10. Even though the member 10 is capable of slight radial adjustment when the screws 9 are loosened, when they are tightened it is held firmly in place so that the bushing 32 in association with the bushing 34 provides a long span of support for the rod 14 and hence will minimize lateral movement or deflection of said rod.

By placing the O-ring 37 as far inwardly as possible, pressure fluid is prevented from working between the cartridge casing 26 and the wall of the recess 27 as well as from working between the cartridge casing 26 and the portion of the member 10 in contact therewith. Since if pressure fluid entered between the cartridge casing and the member 10 in this manner, it would almost always urge such cartridge casing eccentrically, the presence of the O-ring 37 prevents such flow of pressure fluid and thus prevents eccentric urging of the cartridge casing 26 and thereby prevents eccentric pressure of the packing 33 and bushing 32 against the shaft 14 with the resultant uneven wear which would otherwise occur.

FIGURE 4 shows a modification in which the inner extremity of the bushing 34 is spaced from the shoulder 36 and a wave washer 41 is inserted between the inner extremity of the bushing and the shoulder 36 to assist in holding pressure on the V-shaped packing.

Thus, although a particular preferred embodiment of the invention has been disclosed herein for illustrative purposes, it will be understood that variations or modifications of such disclosure, which lie within the scope of the appended claims, are fully contemplated.

What is claimed is:

1. In a cylinder construction for pressure fluid operation having piston and rod means, the improvement in means for mounting, guiding and sealing said rod with respect to that end of the cylinder through which said rod passes, comprising in combination:

an end fitting having an opening therethrough for the passage of said rod, the outer end of said opening being enlarged to provide a recess and a shoulder between said recess and the remainder of said opening;

a support member having a threaded opening therethrough and arranged axially outwardly of said end fitting and held in fixed axial relationship with respect thereto;

a cartridge casing having an axial inner end portion whose external wall slidably engages the radial walls of said recess and having external threading engaging the threaded opening in said support member, retaining means extending radially inwardly from the axially outer end of said cartridge casing, an outer bushing snugly received within the outer end of said casing and seated solidly against said retaining means, resilient packing means located adjacent said outer bushing and having one of its ends seated endwise thereagainst and an inner bushing bearing axially against said packing means and radially against the other end of said cartridge casing, the axially inner end of said inner bushing extending inwardly beyond the inner end of said casing for bearing against said shoulder recess;

whereby upon screwing of said cartridge casing inwardly with respect to said support member, the inner bushing will engage said shoulder and be urged axially outwardly with respect to said casing for compressing said packing.

2. The device defined in claim 1 wherein the radially inner and outer corners of the outer axial end of said inner bushing are sealed to prevent access of the pressure fluid to the outer end of the said inner bushing whereby pressure fluid bearing on the inner end of said inner bushing will urge same against said packing for compressing same.

3. The device defined in claim 1 including also an axially inwardly opening recess in the radially inner surface of said inwardly extending retaining means and a rod wiper located in said recess.

4. The device defined in claim 1 wherein the axially outer face of said inner bushing defines a radial plane and wherein said packing is of substantially V-shaped cross section having open sides, and said packing is arranged with its open sides substantially spanning the radial width of the inner bushing wherein to seal against the passage of pressure fluid from within the cylinder to the axially outer end of said inner bushing.

5. A cartridge type bushing and retaining device comprising:
   means having an opening therethrough through which a rod slidably extends, said opening having an enlarged outer portion terminating in an inwardly extending shoulder at the inner end of said outer portion of said rod opening;
   means defining an internally threaded opening located outwardly of and adjacent to the outer end of said rod opening;
   a cylindrical cartridge casing extending through said threaded opening and into the outer portion of said rod opening, said cartridge casing having an axially inner end portion whose external wall slidably engages the wall of said outer portion, said cartridge casing also having external threads engaging said threaded opening, said casing having an outer bushing and an inner bushing disposed therewithin in axially spaced relation and slidably engaging and supporting said rod, the inner bushing being slidable axially with respect to the outer bushing and means at the inner end of said inner bushing extending beyond the end of said casing into engagement with said shoulder whereby movement of said casing toward said shoulder effects axial movement of said inner bushing; and
   packing means within said casing between said bushings and adapted to be held in compression thereby.

6. A pressure cylinder comprising:
   a cylinder having a piston rod slidable therewithin;
   an end fitting secured to one end of said cylinder, said end fitting having an opening through which said rod extends, said rod opening having an outer end portion of enlarged diameter terminating at its axially inner end in a radially inwardly extending shoulder;
   a support member secured to the outer axial end of said end fitting and having an internally threaded opening coaxial with and constituting an extension of said rod opening, said support member having screw extending axially therethrough adjacent the periphery thereof;
   screws extending loosely through said screw openings and into said end fitting whereby support member may be moved a slight distance radially with respect to said end fitting and then may be clamped thereto;
   a cllindrical cartridge casing having an external wall which is smooth along the axially inner end portion thereof and which is threaded along the axially outer end portion thereof, the threaded portion of the cartridge casing threadedly engaging the threaded opening in said support member and the smooth portion of said cartridge casing extending slidably into said outer end portion of said rod opening;
   an inner bushing and an outer bushing slidably received within said casing with packing means disposed therebetween;
   retaining means on said casing engaging said outer bushing for preventing said outer bushing from being moved axially outwardly of said casing;
   said inner bushing projecting infardly beyond the inner end of said casing and engaging said shoulder whereby when said casing is threaded further into said support member said outer bushing is moved toward said inner bushing and said packing means is compressed.

References Cited by the Examiner
UNITED STATES PATENTS

| | | | |
|---|---|---|---|
| 2,713,522 | 7/55 | Petch | 308—36.1 |
| 2,874,983 | 2/59 | Densmore | 277—4 |
| 2,907,596 | 10/59 | Maha | 277—205 |
| 3,003,797 | 10/61 | Gage | 277—124 |

ROBERT C. RIORDON, *Primary Examiner.*

FRANK SUSKO, *Examiner.*

UNITED STATES PATENT OFFICE
CERTIFICATE OF CORRECTION

Patent No. 3,208,803                      September 28, 1965

William E. Hennells et al.

It is hereby certified that error appears in the above numbered patent requiring correction and that the said Letters Patent should read as corrected below.

Column 6, line 3, after "screw" insert -- openings --.

Signed and sealed this 24th day of May 1966.

(SEAL)
Attest:

ERNEST W. SWIDER                      EDWARD J. BRENNER
Attesting Officer                      Commissioner of Patents